(12) United States Patent
Wang et al.

(10) Patent No.: US 12,272,119 B2
(45) Date of Patent: Apr. 8, 2025

(54) ADAPTIVE IMAGE CLASSIFICATION

(71) Applicant: GM Cruise Holdings LLC, San Francisco, CA (US)

(72) Inventors: Victor Wang, San Diego, CA (US); Yumin Shen, Fremont, CA (US); Zayra Lobo, Sunnyvale, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 360 days.

(21) Appl. No.: 18/071,255

(22) Filed: Nov. 29, 2022

(65) Prior Publication Data
US 2024/0177452 A1 May 30, 2024

(51) Int. Cl.
| | |
|---|---|
| G06V 20/58 | (2022.01) |
| G06T 7/11 | (2017.01) |
| G06V 10/764 | (2022.01) |
| G06V 10/774 | (2022.01) |
| G06V 20/56 | (2022.01) |

(52) U.S. Cl.
CPC .......... *G06V 10/764* (2022.01); *G06V 10/774* (2022.01); *G06V 20/56* (2022.01)

(58) Field of Classification Search
CPC ...... G06V 10/82; G06V 10/764; G06V 20/58; G06V 10/454; G06V 10/774; G06V 20/582; G06V 10/25; G06V 20/10; G06V 20/40; G06V 20/52; G06V 20/56; G06N 3/08; G06N 3/045; G06N 3/084; G06F 18/24; G06F 18/214; G06F 18/2414; G06F 18/2148; G06F 18/217; G06F 18/241
See application file for complete search history.

(56) References Cited

U.S. PATENT DOCUMENTS

| | | | | |
|---|---|---|---|---|
| 2016/0140425 | A1* | 5/2016 | Kulkarni | G06F 18/2411 382/159 |
| 2018/0373963 | A1* | 12/2018 | Lo | G06V 10/82 |
| 2019/0130223 | A1* | 5/2019 | Anderson | G06N 3/045 |

\* cited by examiner

*Primary Examiner* — Quan M Hua

(57) ABSTRACT

Aspects of the subject technology relate to systems, methods, and computer-readable media for image classification through a two-stage classifier. Raw image data of an image gathered by a sensor associated with an AV during operation of the AV is accessed. A first stage of a two-stage classifier is applied. The first stage is trained by first raw AV data captured at varying values of one or more capture parameters associated with one or more sensors of the AV in capturing the first raw AV data. A second stage of the two-stage classifier is applied to the raw image data to generate a final classification output. The second stage of the two-stage classifier if formed by a plurality of image calibration classifiers that are trained by second raw AV data at varying values of one or more image calibration parameters.

20 Claims, 7 Drawing Sheets

ADAPTIVE IMAGE CLASSIFICATION

BACKGROUND

1. Technical Field

The present disclosure generally relates to image classification by varying capture parameters and, more specifically, to image classification by varying capture parameters through a two-stage classifier.

2. Introduction

An autonomous vehicle (AV) is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying the drawings in which.

DETAILED DESCRIPTION

Figure 1:
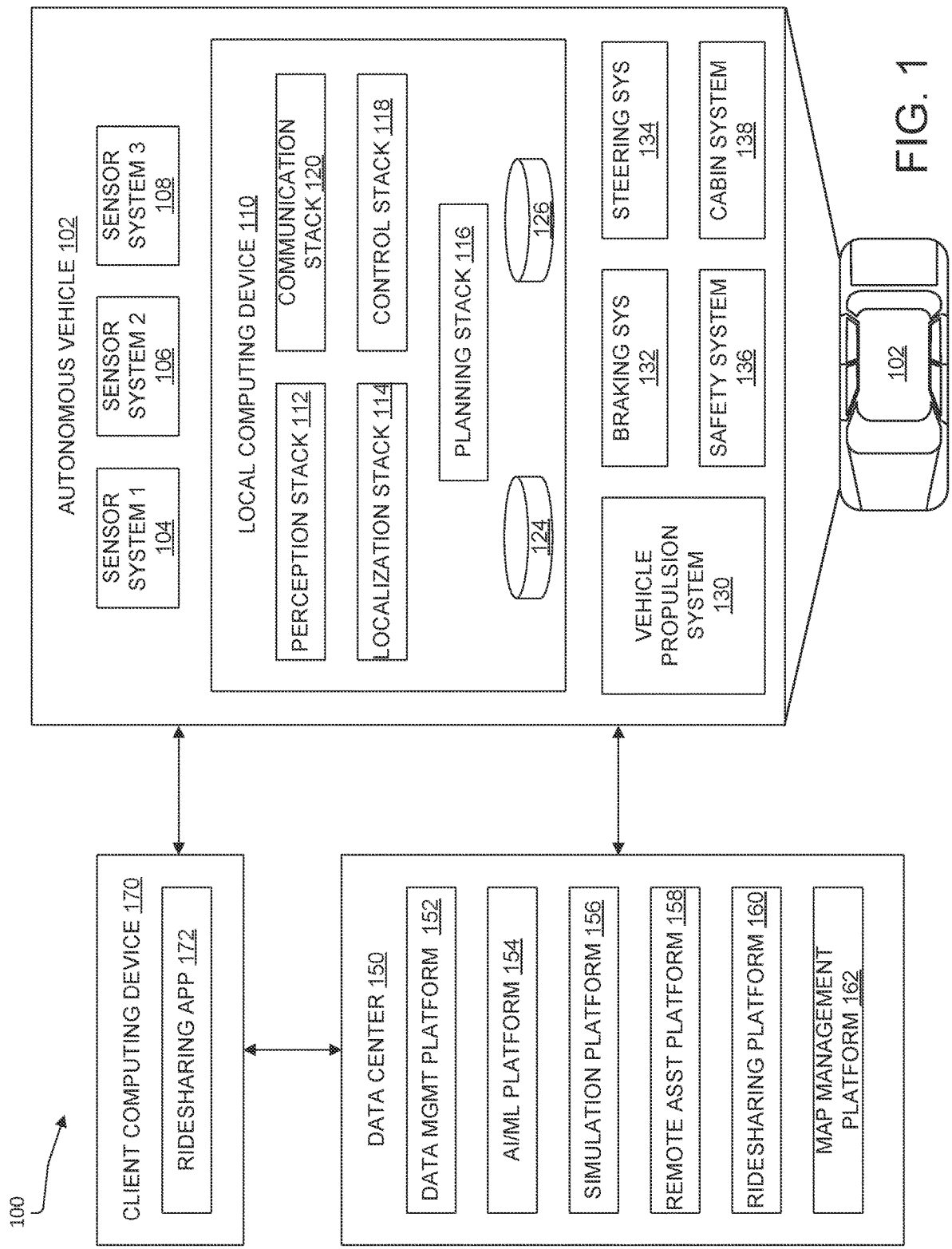
FIG. 1 illustrates an example system environment that can be used to facilitate AV dispatch and operations, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

A software stack can be used to control an autonomous vehicle (AV). In particular, a software stack can include various dependent processes that can be implemented to control an AV. In order to both develop the software stack and control an AV, a large amount of data is needed. Data for further refining the modules of the software stack can be collected by the AV while operating using a current version of the stack. Specifically, the AV can record sensory information captured by sensors and outputs from various AV nodes, e.g., software stack nodes, that are executed during operation of the nodes. Such data can be referred to as raw AV data. This data can be used to control the AV. Further this data can be used to analyze the behavior of the AV and to mine for on-road scenes of interest that can be used for testing the AV.

The captured sensor data, included as part of the raw AV data, can be analyzed by a perception stack in either or both controlling an AV and analyzing the behavior of the AV for scenes of interest. In analyzing the raw AV data, image classification can be performed on the raw AV data. Image classification can be performed through various techniques. Central to such techniques is the application of a classification model. However, such techniques and models are deficient for numerous reasons. Specifically, many image classifiers can be inaccurate under certain conditions, e.g., with respect to a capture sensor, otherwise a camera. For example, a sensor can capture a blurry image due to a less than ideal exposure time created by an AV traveling at a high speed. As a result, an image classifier can be deficient in classifying objects in the image and consequently compensating for the blurry image leading to inaccurate image classification.

The disclosed technology addresses the problems associated with image classification by implementing image classifiers that are trained on either or both varying capture parameters and varying image calibration parameters. Further, the disclosed technology addresses the problems associated with image classification by implementing a two-stage image classifier with a second classifier that is selected based on an output of a first classifier. While the present technology is described with respect to AVs, the technology can be applied to any applicable image classification scenario. Further, while the present technology is described with respect to image classification, the technology can be applied to any applicable image processing or characterizing technique utilizing trained models, such as foreground and background segmentation.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate about roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

AV 102 can also include several mechanical systems that can be used to maneuver or operate AV 102. For instance, the mechanical systems can include vehicle propulsion system 130, braking system 132, steering system 134, safety system 136, and cabin system 138, among other systems. Vehicle propulsion system 130 can include an electric motor, an internal combustion engine, or both. The braking system 132 can include an engine brake, a wheel braking system (e.g., a disc braking system that utilizes brake pads), hydraulics, actuators, and/or any other suitable componentry configured to assist in decelerating AV 102. The steering system 134 can include suitable componentry configured to control the direction of movement of the AV 102 during navigation. Safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, an High Definition (HD) geospatial database 122, and an AV operational database 124, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 can detect and classify objects and determine their current and predicted locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth.

Mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 122 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 116 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 102 from one point to another. The planning stack 116 can determine multiple sets of one or more mechanical operations that the AV 102 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 can select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 can manage the operation of the vehicle propulsion system 130, the braking system 132, the steering system 134, the safety system 136, and the cabin system 138. The control stack 118 can receive sensor signals from the sensor systems 104-108 as well as communicate with other stacks or components of the local computing device 110 or a remote system (e.g., the data center 150) to effectuate operation of the AV 102. For example, the control stack 118 can implement the final path or actions from the multiple paths or actions provided by the planning stack 116. This can involve turning the routes and decisions from the planning stack 116 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 122 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108 and other components of the AV 102 and/or data received by the AV 102 from remote systems (e.g., the data center 150, the client computing device 170, etc.). In some embodiments, the raw AV data can include HD LIDAR point cloud data, image or video data, RADAR data, GPS data, and other sensor data that the data center 150 can use for creating or updating AV geospatial data.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes one or more of a data management platform 152, an Artificial Intelligence/Machine Learning (AI/ML) platform 154, a simulation platform 156, a remote assistance platform 158, a ridesharing platform 160, and a map management platform 162, among other systems.

Data management platform 152 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102 and from third party sources, including rendering geospatial information and road infrastructure (e.g., streets, lanes, crosswalks, traffic lights, stop signs, etc.) obtained from the map management platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to be picked up or dropped off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

Figure 2:
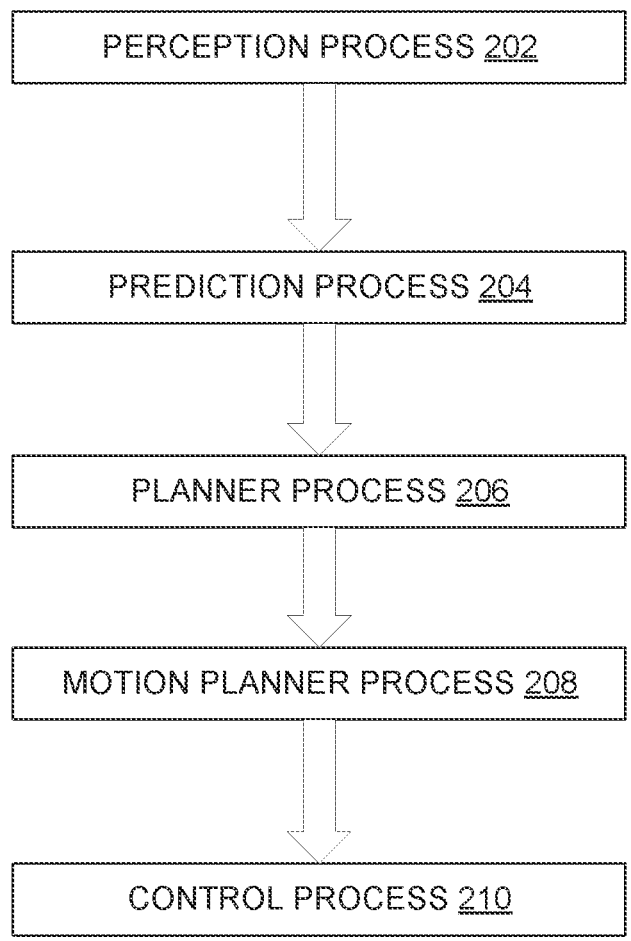
FIG. 2 illustrates a conceptual flow of an example software stack that is run in association with the operation of an AV, according to some examples of the present disclosure.

FIG. 2 illustrates a conceptual flow 200 of an example software stack that is run in association with the operation of an AV. The example AV software stack shown in FIG. 2 includes applicable processes that can be used in controlling an AV, such as the stacks shown in FIG. 1. Specifically, the example AV software stack shown in FIG. 2 includes a perception process 202, a prediction process 204, a planner process 206, a motion planner process 208, and a control process 210.

The perception process 202 functions to access sensor data gathered by an AV. The perception process 202 can fuse the sensor data. From the sensor data, the perception process 202 can track objects. Specifically, the perception process 202 can identify where tracked objects are in a field of view, e.g. relative to the AV.

The prediction process 204 functions to predict where objects will be in a field of view. Specifically, the prediction process 204 can predict the location of objects that are not tracked by the perception process 202. The prediction process 204 can predict the location of objects based on the tracked object output of the perception process 202.

The planner process 206 functions to identify a path for the AV. Specifically, the planner process 206 functions to identify a path for the AV based on either or both the output of the perception process 202 and the prediction process 204. In identifying a path for the AV, the planner process can weigh various moves by the AV against costs with respect to the output of either or both the perception process 202 and the prediction process 204.

The motion planner process 208 functions to identify a refined path for the AV. In particular, the motion planner process 208 functions to identify a refined path for the AV with respect to the path identified by the planner process 206. A refined path developed by the motion planner process 208 can include a path that is planned according to smaller time operations and smaller distances in comparison to the scheme that is used to develop the path by the planner process 206.

The control process 210 functions to communicate with control systems of the AV to implement the plan developed by either or both the planner process 206 and the motion planner process 208. Specifically, the control process 210 can communicate values of parameters for controlling the AV to applicable systems for controlling the AV. For example, the control process 210 can specify to an acceleration controller of the AV to accelerate at 10%.

Figure 3:
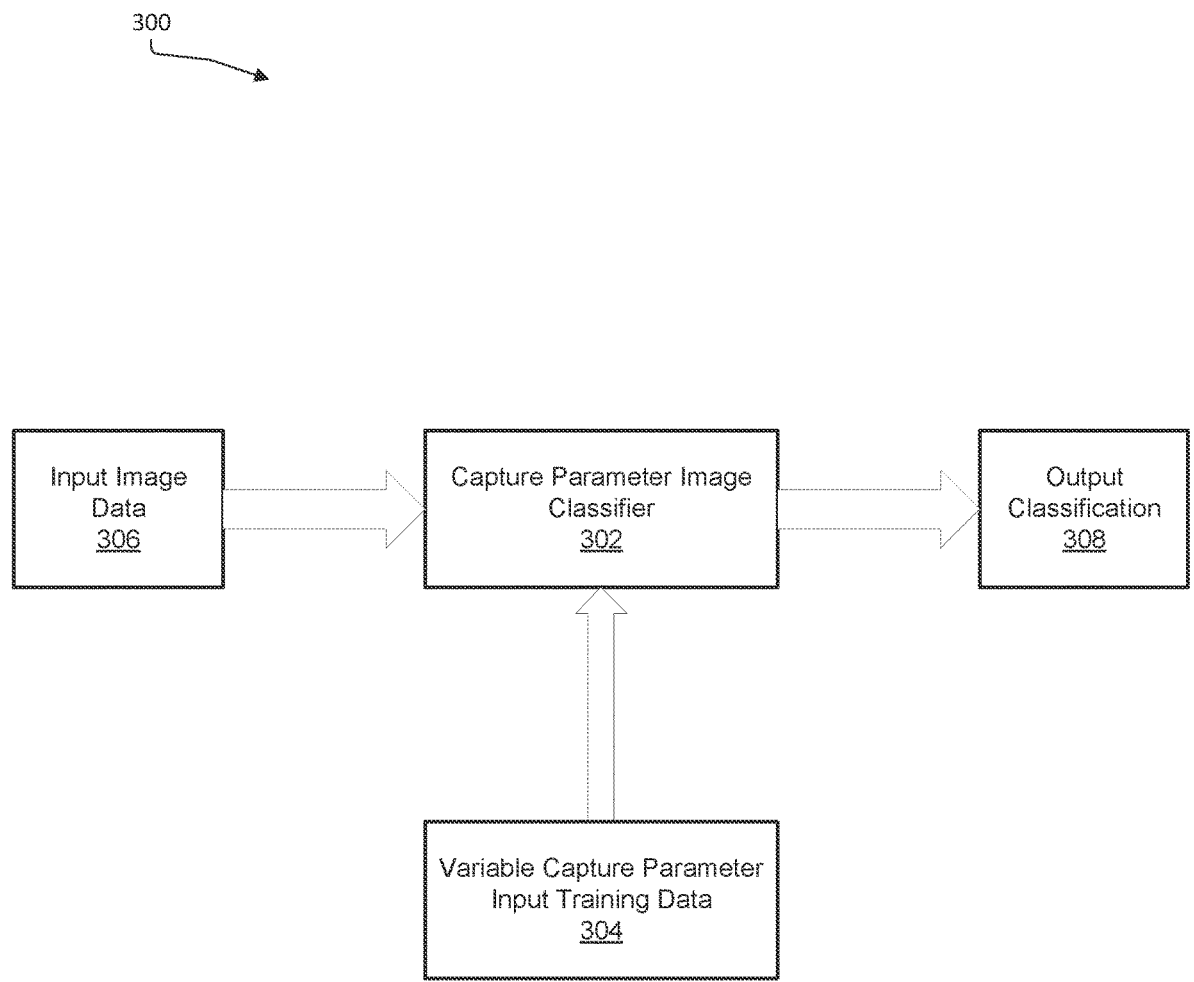
FIG. 3 illustrates an environment for training and implementing a capture parameter image classifier, according to some examples of the present disclosure.

The disclosure now continues with a discussion of image classification based on varying capture parameters. Specifically, FIG. 3 illustrates an environment 300 for training and implementing a capture parameter image classifier 302. The capture parameter image classifier 302 functions according to an applicable classifier for classifying images from gathered sensor data. Specifically, the capture parameter image classifier 302 can implement one or more applicable machine learning techniques for classifying images from gathered sensor data. For example, the capture parameter image classifier 302 can implement one or more neural networks for classifying an image from raw sensor data.

The capture parameter image classifier 302 can be configured to classify images from raw sensor data gathered by an applicable sensor. Specifically, the capture parameter image classifier 302 can be configured to classify images from raw sensor data gathered by a camera. More specifically, the capture parameter image classifier 302 can be configured to classify images from raw sensor data gathered by an AV camera. Images classified by the capture parameter image classifier 302 can be used in either or both controlling operation of an AV and serving as data that can later be rerun, e.g. as part of a test, for a scene of interest. For example, images that are classified by the capture parameter image classifier 302 can be fed to a software stack, e.g. the perception process 202, for controlling an AV in operating in an environment. Further, images classified by the capture parameter image classifier 302 can serve to further modify, or otherwise train, the capture parameter image classifier 302.

The capture parameter image classifier 302 functions to classify images based on varying capture parameters. Capture parameters, as used herein, can include applicable parameters of a sensor that can be adjusted for affecting the process of gathering, or otherwise generating, raw sensor data. Specifically, capture parameters can include applicable parameters of a camera that can be adjusted to affect the process of the camera generating raw image data. Examples of capture parameters for a sensor include an aperture parameter, an exposure parameter, a frame rate parameter, and a gain parameter.

Raw sensor data, or otherwise raw AV data, as used herein, can include applicable data that is generated by a sensor for forming an image. Specifically, raw sensor data can include data that is generated at a capture phase of a sensor capturing the data. For example, raw sensor data can include data of a scene that is generated by a camera at a varying exposure level, frame rate, and/or gain level.

Further, raw sensor data can include data that is processed, and otherwise generated, during an image calibration phase. As will be discussed in greater detail later, an image calibration phase can include processes that are performed on captured image data to further modify or improve the captured raw sensor data, e.g. after it is captured during a capture phase with varying capture parameters. Specifically, an image calibration phase can include varying different calibration parameters, as will be discussed in greater detail later, during steps of processing captured raw sensor data. A calibration phase can be carried out to improve aspects of an image for various applications. For example, a calibration phase can include a process of modifying image data to increase the contrast of a foreground object with respect to a background.

The capture parameter image classifier 302 is trained using variable capture parameter input training data 304. The variable capture parameter input training data 304 includes labeled data. Specifically, the variable capture parameter input training data 304 can include labeled raw sensor data that is generated at varying values of capture parameters. More specifically, the variable capture parameter input training data 304 can include labeled raw sensor data that is generated at varying values of capture parameters during operation of an AV. For example, the variable capture parameter input training data 304 can include labeled data that is captured at varying exposure levels, frame rates, and/or gain levels. More specifically, the variable capture parameter input training data 304 can include image data with exaggerated hues and/or coloration, e.g. in relation to a normal image gathered by a sensor.

The variable capture parameter input training data 304 can be labeled according to applicable characterizations for classifying images from raw sensor data. Specifically, the variable capture parameter input training data 304 can be labeled to include indications of objects that are represented in images of corresponding raw sensor data. For example, the variable capture parameter input training data 304 can be labeled to include that an object in a sequence of images gathered by a camera of an AV is a traffic light. In another example, the variable capture parameter input training data 304 can be labeled to include that an object in a sequence of images gathered by a camera of an AV is a stop sign at an intersection. Further, the variable capture parameter input training data 304 can be labeled to include indications of the corresponding values of the capture parameters when the raw sensor data was generated. For example, the variable capture parameter can include an exposure level, a frame rate, and/or a gain level that was used in generating raw AV data. Capture parameters can be related to or depend on environmental characteristics associated with capturing the raw AV data. For example, capture parameters can be related to environmental colors captured in the raw AV data, environmental temperatures, a speed of a device capturing the raw AV data, and other applicable environmental characteristics related to capturing raw AV data.

The variable capture parameter input training data 304 can be labeled through an applicable technique for labeling training data for an image classifier. Specifically, the variable capture parameter input training data 304 can be manually labeled. More specifically, the variable capture parameter input training data 304 can be manually labeled to include an indication of objects represented in images of the variable capture parameter input training data 304. Further, the variable capture parameter input training data 304 can be manually labeled to include an indication of values of capture parameters that were used in generating the variable capture parameter input training data 304.

Once the capture parameter image classifier 302 is trained using the variable capture parameter input training data 304, input image data 306 can be fed to the capture parameter image classifier 302 to classify an image represented in the input image data 306. The input image data 306 can include raw sensor data, e.g. raw AV sensor data, that is captured and fed to the capture parameter image classifier 302. For example, the input image data 306 can include camera image data captured by an AV during operation of the AV.

The input image data 306 can include raw sensor data that is captured at varying values of capture parameters. Accordingly, the capture parameter image classifier 302 can process the input image data 306 according to the corresponding values of the capture parameters that were used in generating the input image data 306. For example, the capture parameter image classifier 302 can process input image data 306 that is gathered at exaggerated hues and colorations, e.g. with respect to an image that is captured with unvaried capture parameters. In another example, the capture parameter image classifier 302 can process input image data 306 that is gathered at a longer or shorter exposure time, e.g. with respect to an image that is captured with unvaried capture parameters.

By being trained on data captured at varying capture parameters and classifying input data that is generated at varying capture parameters, improved classification accuracy can be achieved. Specifically, the capture parameter image classifier 302 can be trained on a wider array of data, e.g. in comparison to a classifier that is trained on data captured with unvaried capture parameters, thereby leading to improved classification accuracy. Further, the capture parameter image classifier 302 can analyze a wider array of input data, e.g. in comparison to a classifier that is configured to process data captured with unvaried capture parameters, thereby leading to improved classification accuracy.

In being trained on data captured at varying exposure levels and configured to process data captured at varying exposure levels, the capture parameter image classifier 302 can offer improved classification accuracy, e.g. in comparison to a classifier that is configured to process data captured with unvaried capture parameters. Specifically, a classifier can make an erroneous classification when processing an image gathered at a short exposure time, e.g. as if the classifier is viewing the image and classifying the image in a very short time. However, processing image data over a long exposure time can allow the capture parameter image classifier 302 to act as if it is viewing and classifying the image over a long time, thereby improving classification accuracy.

The capture parameter image classifier 302 functions to generate an output classification 308 for the input image data 306. Specifically, the output classification 308 can include an indication of an object that is detected in an image from the input image data 306. Further, the output classification 308 can be associated with values of the capture parameters that were varied in generating the input image data 306. Specifically, the output classification 308 can be indicative of the values of the capture parameters that were used in generating the input image data 306. For example, the output classification 308 can include that a traffic light is detected in the input image data 306 and that the input image data 306 was captured at an extended exposure level. As will be discussed in greater detail later, the output classification 308 can be used in applying a second stage of a two-stage classifier that is formed with the capture parameter image classifier 302. For example, a second stage of the classifier can be selected based on the values of the capture parameters associated with, e.g. indicated through, the output classification 308.

Figure 4:
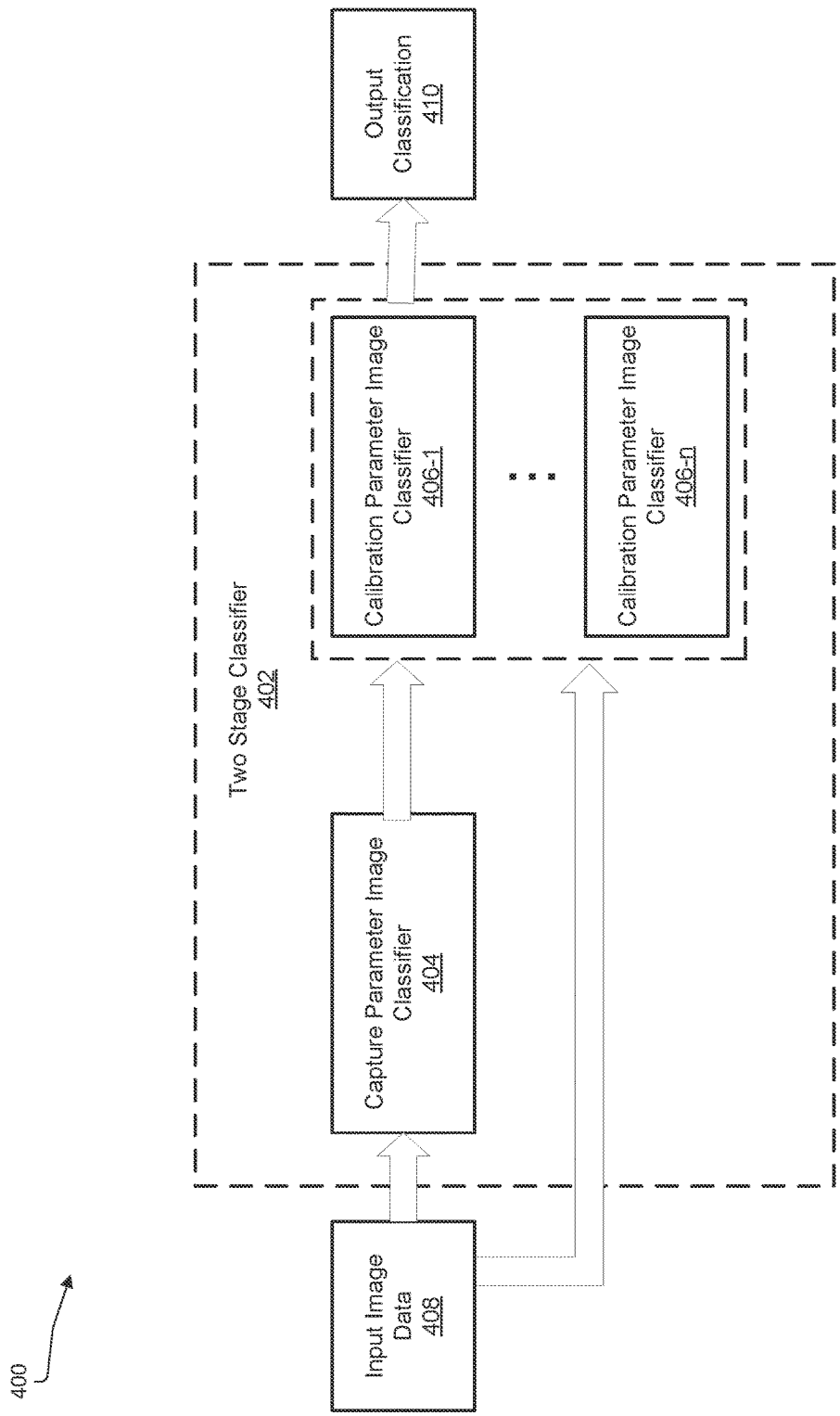
FIG. 4 illustrates an example environment for operating a two-stage classifier in performing image classification, according to some examples of the present disclosure.

The disclosure now continues with a discussion of a two-stage classifier for classifying images based on both varying capture parameters and varying image calibration parameters. Specifically, FIG. 4 illustrates an example environment 400 for operating a two-stage classifier 402 in performing image classification. The two-stage classifier 402 includes a capture parameter image classifier 404. The capture parameter image classifier 404 functions according to an applicable classifier that classifies an image based on varying capture parameters, such as the capture parameter image classifier 302 shown in FIG. 3. Specifically, the capture parameter image classifier 404 can be configured to classify an image in corresponding raw sensor data based on varying capture parameters in generating the raw sensor data.

The two-stage classifier 402 includes a first calibration parameter image classifier 406-1 to an n-calibration parameter image classifier 406-*n* (herein referred to as a "plurality of calibration parameter image classifiers 406."). The plurality of calibration parameter image classifiers 406 can include a plurality of different classifiers that are configured to operate on different types of raw sensor data. Specifically, the plurality of calibration parameter image classifiers 406 can include different classifiers that are configured to classify different objects or types of objects in images. For example, the plurality of calibration parameter image classifiers 406 can include one or more classifiers that are configured to detect which light in a traffic light is operational. In another example, the plurality of calibration parameter image classifiers 406 can include one or more classifiers that are configured to detect a specific type of traffic sign when a traffic sign is detected on the road, e.g. through the capture parameter image classifier 404.

The plurality of calibration parameter image classifiers 406 can also include classifiers that are configured to process raw sensor data that is generated at varying values of image calibration parameters. As discussed previously, image calibration parameters include applicable parameters that can be adjusted in processing raw sensor data to further refine and generate new raw sensor data, e.g. to highlight a different aspect of the data. Specifically, image calibration parameters can include a contrast parameter, a tone mapping parameter, a color rendering parameter, and a histogram stretching parameter. For example, raw sensor data can include gathered sensor data that is processed to vary the color rendering in corresponding images of the sensor data. In another example, raw sensor data can include gathered sensor data that is processed to vary the colors that are mapped to each other in corresponding images of the sensor data. Other examples of image calibration parameters include adjusting radial distortion, adjusting focal length/focus, and applicable image engineering effects such as adjusting white balance and color saturation effects.

In being configured to process raw sensor data that is generated at varying values of image calibration parameters, the plurality of calibration parameter image classifiers 406 can be trained with raw sensor data that is processed at varying values of image calibration parameters. More specifically, and similar to the discussion with respect to training of the capture parameter image classifier 302, the plurality of calibration parameter image classifiers 406 can be trained with raw sensor data that includes labels of the values of the image calibration parameters used in processing the training data. Additionally, and similar to the discussion with respect to training of the capture parameter image classifier 302, the plurality of calibration parameter image classifiers 406 can be trained with raw sensor data that is labeled with classified output of the raw sensor data. For example, the first calibration parameter image classifier 406-1 can be trained with data labeled to include the different types of traffic signs in images formed by the data.

In being configured to classify different objects or types of objects in images, the calibration parameter image classifiers 406 can be specific to the objects or types of objects that the corresponding classifiers are configured to classify. For example, the first calibration parameter image classifier 406-1 can be a specific classifier of the calibration parameter image classifiers 406 that is configured to detect different colored lights in detected traffic lights. Further, in being configured to operate on raw sensor data that is processed at varying calibration parameters, the calibration parameter image classifiers 406 can be specific to different values of the calibration parameters. For example, the first calibration image classifier 406 can be specific to particular color renderings used in processing raw sensor data. In another example, the first calibration parameter image classifier 406 can be specific to one or more particular tone mappings.

Each of the plurality of calibration parameter image classifiers 406 is selectable from the plurality of calibration parameter image classifiers 406. As follows, the selected calibration parameter image classifier can be applied to raw sensor data as part of the second stage of the two-stage classifier 402. The calibration parameter image classifiers 406 can be selected for application in the two-stage classifier 402 based on the output of the capture parameter image classifier 404. Therefore, the calibration parameter image classifier of the calibration parameter image classifiers 406 that is applied in the two-stage classifier 402 can depend on application of the capture parameter image classifier 404. As follows, the capture image classifier 404 and the selected calibration parameter image classifier that is applied from the calibration parameter image classifiers 406 can form the corresponding two-stages of the two-stage classifier 402.

Further, each of the plurality of calibration parameter image classifiers 406 can be selected based on an object and/or an object type that is associated with or otherwise specific to each of the plurality of calibration parameter image classifiers 406. Additionally, each of the plurality of calibration parameter image classifiers 406 can be selected based on values of the calibration parameters used in processing the input data associated with each of the classifiers, or otherwise used in training the classifiers. For example, the first calibration parameter image classifier 406-1 can be selected based on the classifier 406-1 being trained with data processed at one or more specific color renderings.

In being selectable based on an output of the first stage, corresponding calibration parameter image classifiers of the plurality of calibration parameter image classifiers can correspond to different outputs of the capture parameter image classifier 404. Specifically, objects, object types, and varying values of calibration parameters can correspond to specific outputs of the capture parameter image classifier 404. In turn, the calibration parameter image classifiers 406 can correspond to, or otherwise be correlated with, the different outputs of the capture parameter image classifier 404 based on one or a combination of object, object types, and varying values of calibration parameters that are associated with the capture parameter image classifier 404 outputs and the calibration parameter image classifiers 406. For example, an output of the capture parameter image classifier 404 can detect a traffic sign in image data. In turn, a calibration parameter image classifier can be selected and applied that is used in classifying a type of traffic sign that is present in a region of interest when a traffic sign is detected in the region of interest.

The values of capture image parameters associated with the outputs of the capture image classifier 404 can correspond to values of the calibration parameters. In turn, the outputs of the capture image classifier 404 can be correlated with different classifiers of the calibration parameter image classifiers 406 based on the corresponding values of the calibration parameters and values of the capture image parameters. As follows, the calibration parameter image classifiers can be selected according to the outputs of the capture parameter image classifier 404 based on this correlation. For example, a specific tone mapping can correspond with or otherwise be used in enhancing raw sensor data captured at a specific camera gain. In turn, when the output of the capture parameter image classifier was generated with raw sensor data gathered at the specific camera gain, then a calibration parameter image classifier configured to process data with the specific tone mapping can be applied.

In operation of the two-stage classifier 402, input image data 408 can be fed as input to the capture parameter image classifier 404. The capture parameter image classifier 404 can be applied, based on the capture parameter values used in capturing the input image data 408, to generate an output as part of applying the first stage of the two-stage classifier 402. The first calibration parameter image classifier 406-1 can be selected based on the output of the capture parameter image classifier 404 from the first stage of the two-stage classifier. Then, the first calibration parameter image classifier 406-1 can be applied to the input image data 408 as part of the second stage of the two-stage classifier 402 to generate the final output classification 410 of the two-stage classifier 402.

Figure 5:
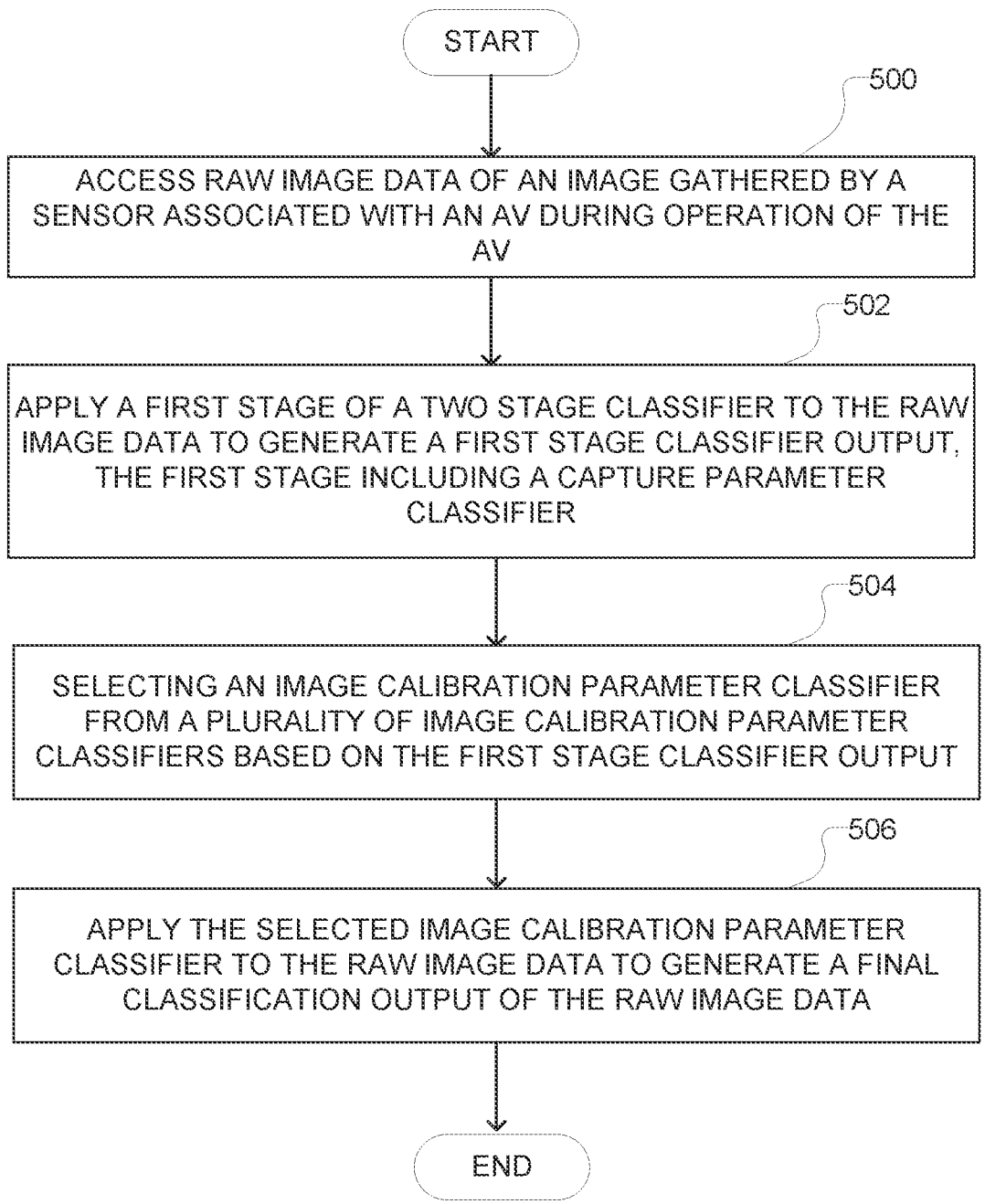
FIG. 5 illustrates a flowchart for an example method of applying a two-stage classifier based on varied capture parameters and varied calibration parameters to classify raw sensor data, according to some examples of the present disclosure.

FIG. 5 illustrates a flowchart for an example method of applying a two-stage classifier based on varied capture parameters and varied calibration parameters to classify raw sensor data. The method shown in FIG. 5 is provided by way of example, as there are a variety of ways to carry out the method. Additionally, while the example method is illustrated with a particular order of operations, those of ordinary skill in the art will appreciate that FIG. 5 and the modules shown therein can be executed in any order and can include fewer or more modules than illustrated. Each module shown in FIG. 5 represents one or more operations, processes, methods or routines in the method.

At operation 500, raw image data, otherwise raw sensor data, of an image gathered by a sensor associated with an AV during operation of the AV is accessed. The raw image data can include data that is captured at varying values of capture parameters. For example, the raw image data can include data that is gathered by the sensor at a varying frame rate. Further, the raw image data can include data that is captured at varying values of image calibration parameters. For example, the raw image data can include data that is captured at varying values of a histogram stretching parameter.

At operation 502, a first stage of a two-stage classifier is applied to the raw image data to generate a first stage classifier output. Specifically, a capture parameter classifier can be applied to the raw image data to generate the first stage classifier output as part of applying a first stage of a two-stage classifier to the raw image data. A capture parameter classifier that is applied at operation 502 can include an applicable classifier that is trained on varying values of sensor capture parameters, such as the capture parameter classifiers described herein. Specifically, a capture parameter classifier that is applied at operation 502 can include an applicable classifier that is configured to classify data captured at varying values of the sensor capture parameters, such as the capture parameter classifiers described herein.

At operation 504, an image calibration parameter classifier is selected from a plurality of image calibration parameter classifiers based on the first stage classifier output. Specifically, an image calibration parameter classifier can be selected based on an object or an object type that is detected in the raw image data by the capture parameter classifier, e.g. as indicated by the first stage classifier output. Further, the image calibration parameter classifier can be selected based on varying capture parameters used to generate the raw image data, e.g. as indicated by the first stage classifier output.

At operation 506, the selected image calibration parameter classifier is applied to the raw image data to generate a final classification output of the raw image data. Specifically, the selected image calibration parameter classifier can be applied to the raw image data as part of a second stage of the two-stage classifier. In applying both an image calibration parameter classifier and a capture parameter classifier, the raw image data can be classified at varying values of both image calibration parameters and capture parameters.

The resulting final classification output of the raw image data can be applied in an applicable application that relies on classifying images from raw image data. Specifically, the resulting final classification output of the raw image data can be used in controlling operation of an AV, e.g. in either or both a real world environment and a simulated environment. More specifically, the final classification output can be fed to an appropriate software stack for controlling an AV, e.g. the perception process 202.

Figure 6:
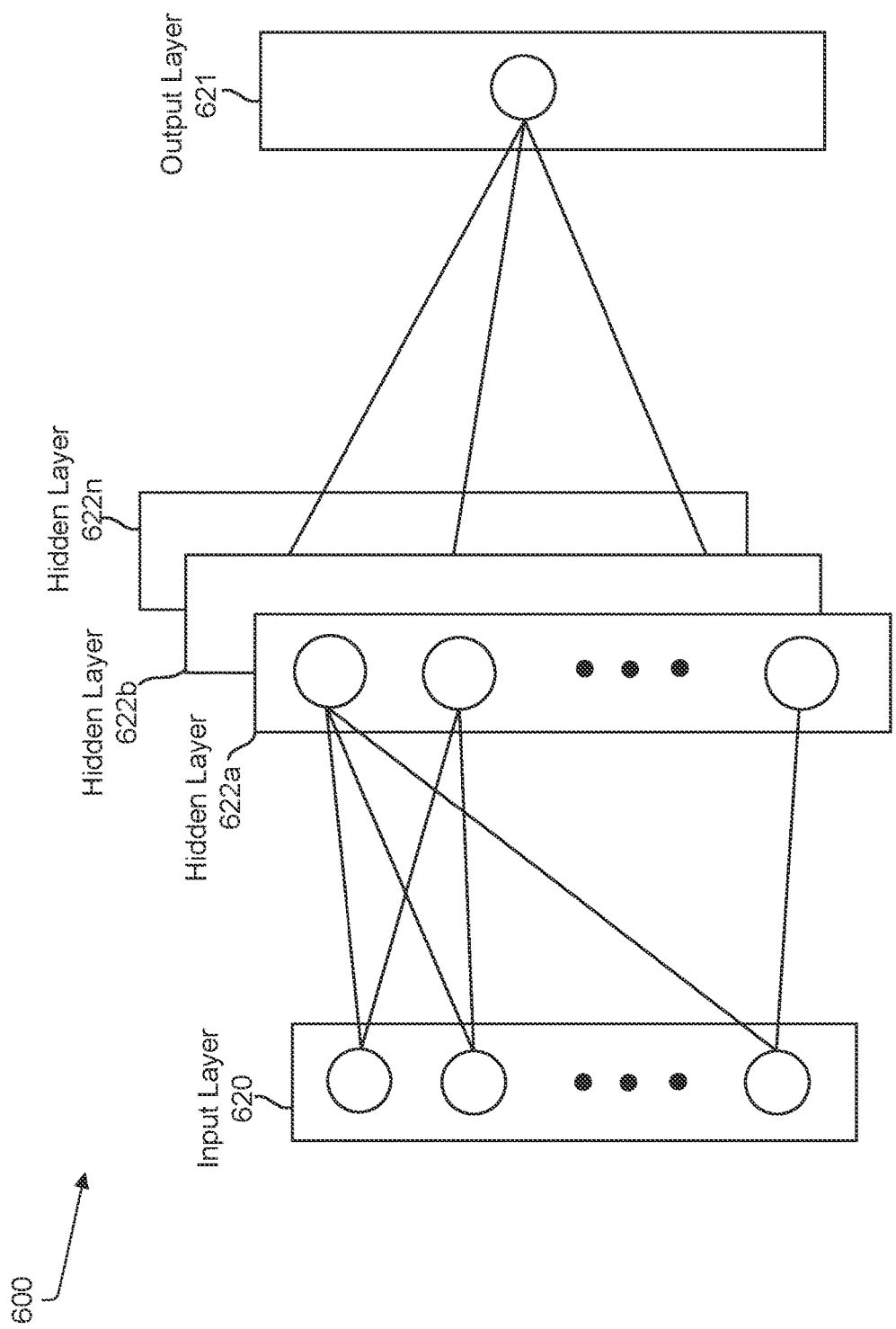
FIG. 6 is an example of a deep learning neural network, according to some examples of the present disclosure.

In FIG. 6, the disclosure now turns to a further discussion of models that can be used through the environments and techniques described herein. FIG. 6 is an example of a deep learning neural network 600 that can be used to implement all or a portion of the systems and techniques described herein. An input layer 620 can be configured to receive sensor data and/or data relating to an environment surrounding an AV. The neural network 600 includes multiple hidden layers 622a, 622b, through 622n. The hidden layers 622a, 622b, through 622n include "n" number of hidden layers, where "n" is an integer greater than or equal to one. The number of hidden layers can be made to include as many layers as needed for the given application. The neural network 600 further includes an output layer 621 that provides an output resulting from the processing performed by the hidden layers 622a, 622b, through 622n.

The neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622a. For example, as shown, each of the input nodes of the input layer 620 is connected to each of the nodes of the first hidden layer 622a. The nodes of the first hidden layer 622a can transform the information of each input node by applying activation functions to the input node information. The information derived from the transformation can then be passed to and can activate the nodes of the next hidden layer 622b, which can perform their own designated functions. Example functions include convolutional, up-sampling, data transformation, and/or any other suitable functions. The output of the hidden layer 622b can then activate nodes of the next hidden layer, and so on. The output of the last hidden layer 622n can activate one or more nodes of the output layer 621, at which an output is provided. In some cases, while nodes in the neural network 600 are shown as having multiple output lines, a node can have a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622a, 622b, through 622n in order to provide the output through the output layer 621.

In some cases, the neural network 600 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 600 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma(\frac{1}{2}(\text{target}-\text{output})^2)$. The loss can be set to be equal to the value of $E\_total$.

The loss (or error) will be high for the initial training data since the actual values will be much different than the predicted output. The goal of training is to minimize the amount of loss so that the predicted output is the same as the training output. The neural network 600 can perform a backward pass by determining which inputs (weights) most contributed to the loss of the network, and can adjust the weights so that the loss decreases and is eventually minimized.

The neural network 600 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 600 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 7:
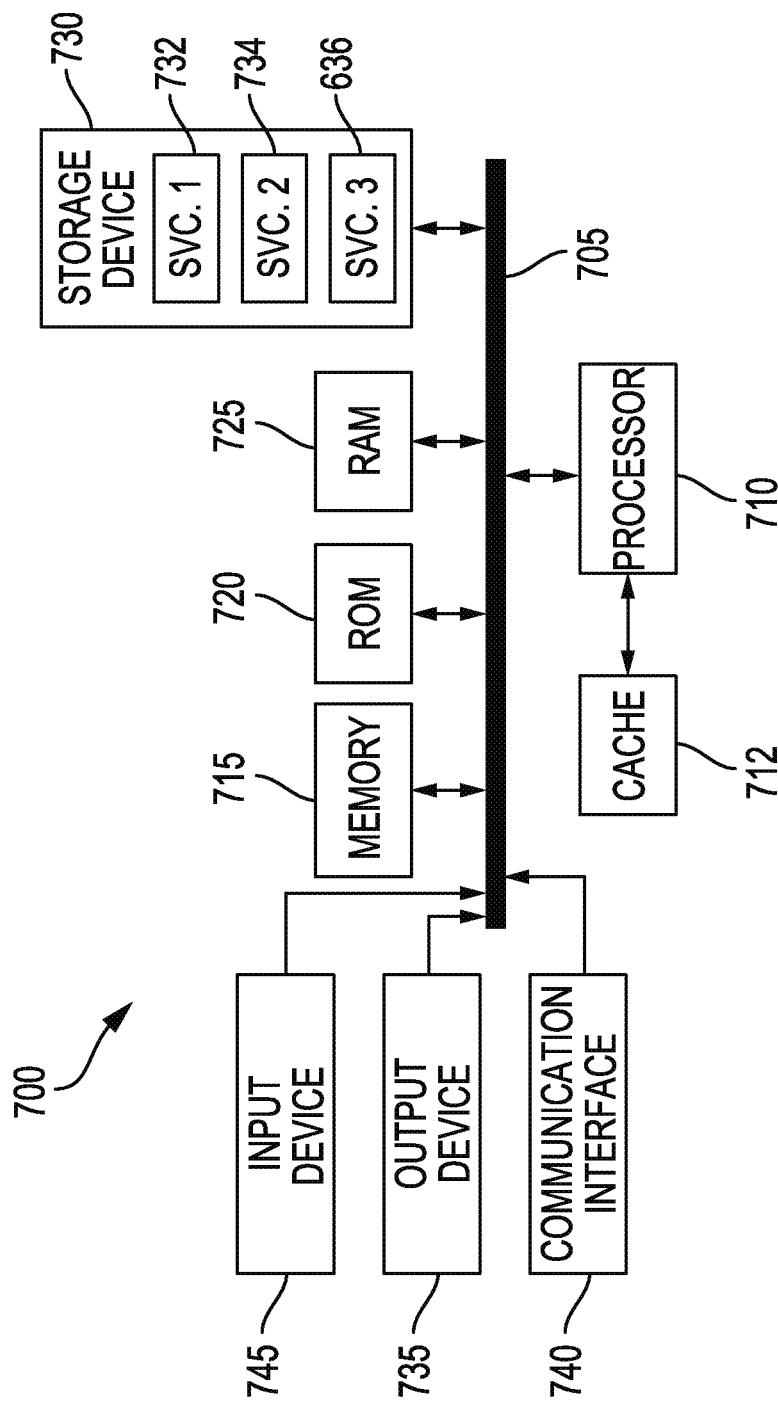
FIG. 7 illustrates an example processor-based system with which some aspects of the subject technology can be implemented, according to some examples of the present disclosure.

FIG. 7 illustrates an example processor-based system with which some aspects of the subject technology can be implemented. For example, processor-based system 700 can be any computing device making up, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing operations of the methods disclosed herein. The particular sequence of such executable instructions or associated data structures represents examples of corresponding acts for implementing the functions described in such operations.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method comprising: accessing raw image data of an image gathered by a sensor associated with an autonomous vehicle (AV) during operation of the AV; applying a first stage of a two-stage classifier to the raw image data to generate a classification output of the first stage of the two-stage classifier, wherein the first stage of the two-stage classifier is trained by first raw AV data captured at varying values of one or more capture parameters associated with operating one or more sensors of the AV in capturing the first raw AV data; applying a second stage of the two-stage classifier to the raw image data to generate a final classification output of the raw image data, wherein: the second stage of the two-stage classifier is formed by a plurality of image calibration classifiers trained by second raw AV data at varying values of one or more image calibration parameters; and an image calibration classifier of the plurality of image calibration classifiers is selected based on the classification output of the first stage of the two-stage classifier and applied to the raw image data as part of applying the second stage of the two-stage classifier to generate the final classification output of the raw image data.

Aspect 2. The method of Aspect 1, wherein the raw image data is captured while varying values of the one or more capture parameters of the sensor associated with the AV.

Aspect 3. The method of Aspects 1 and 2, wherein the plurality of image calibration classifiers correlate to different classification outputs of the first stage of the two-stage classifier and the image calibration classifier is selected from the plurality of image calibration classifiers based on a correlation between the classification output of the first stage and the image calibration classifier.

Aspect 4. The method of Aspects 1 through 3, wherein the plurality of image calibration classifiers are correlated to the different classification outputs of the first stage based on corresponding values of the one or more capture parameters associated with the different classification outputs of the first stage in relation to corresponding values of the one or more image calibration parameters associated with training the plurality of image calibration classifiers.

Aspect 5. The method of Aspects 1 through 4, wherein the plurality of image calibration classifiers are correlated to the different classification outputs of the first stage based on corresponding objects detected as part of the different classification outputs of the first stage.

Aspect 6. The method of Aspects 1 through 5, wherein the one or more capture parameters that are varied in training the first stage of the two-stage classifier include an aperture parameter, an exposure parameter, a frame rate parameter, a gain parameter, or a combination thereof.

Aspect 7. The method of Aspects 1 through 6, wherein the exposure parameter is varied during a time frame and the raw image data captured by the sensor associated with the AV and captured during the time frame includes images captured at different exposure times.

Aspect 8. The method of Aspects 1 through 7, wherein the one or more image calibration parameters that are varied in training the plurality of image calibration classifiers include a contrast parameter, a tone mapping parameter, a color rendering parameter, a histogram stretching parameter, or a combination thereof.

Aspect 9. The method of Aspects 1 through 8, further comprising controlling the operation of the AV based on the final classification output of the raw image data.

Aspect 10. A system comprising: one or more processors; and at least one computer-readable storage medium having stored therein instructions which, when executed by the one or more processors, cause the one or more processors to: access raw image data of an image gathered by a sensor associated with an autonomous vehicle (AV) during operation of the AV; apply a first stage of a two-stage classifier to the raw image data to generate a classification output of the first stage of the two-stage classifier, wherein the first stage of the two-stage classifier is trained by first raw AV data captured at varying values of one or more capture parameters associated with operating one or more sensors of the AV in capturing the first raw AV data; and apply a second stage of the two-stage classifier to the raw image data to generate a final classification output of the raw image data, wherein: the second stage of the two-stage classifier is formed by a plurality of image calibration classifiers trained by second raw AV data at varying values of one or more image calibration parameters; and an image calibration classifier of the plurality of image calibration classifiers is selected based on the classification output of the first stage of the two-stage classifier and applied to the raw image data as part of applying the second stage of the two-stage classifier to generate the final classification output of the raw image data.

Aspect 11. The system of Aspect 10, wherein the raw image data is captured while varying values of the one or more capture parameters of the sensor associated with the AV.

Aspect 12. The system of Aspects 10 and 11, wherein the plurality of image calibration classifiers correlate to different classification outputs of the first stage of the two-stage classifier and the image calibration classifier is selected from the plurality of image calibration classifiers based on a correlation between the classification output of the first stage and the image calibration classifier.

Aspect 13. The system of Aspects 10 through 12, wherein the plurality of image calibration classifiers are correlated to the different classification outputs of the first stage based on corresponding values of the one or more capture parameters associated with the different classification outputs of the first stage in relation to corresponding values of the one or more image calibration parameters associated with training the plurality of image calibration classifiers.

Aspect 14. The system of Aspects 10 through 13, wherein the plurality of image calibration classifiers are correlated to the different classification outputs of the first stage based on corresponding objects detected as part of the different classification outputs of the first stage.

Aspect 15. The system of Aspects 10 through 14, wherein the one or more capture parameters that are varied in training the first stage of the two-stage classifier include an aperture parameter, an exposure parameter, a frame rate parameter, a gain parameter, or a combination thereof.

Aspect 16. The system of Aspects 10 through 15, wherein the exposure parameter is varied during a time frame and the raw image data captured by the sensor associated with the AV and captured during the time frame includes images captured at different exposure times.

Aspect 17. The system of Aspects 10 through 16, wherein the one or more image calibration parameters that are varied in training the plurality of image calibration classifiers include a contrast parameter, a tone mapping parameter, a color rendering parameter, a histogram stretching parameter, or a combination thereof.

Aspect 18. The system of Aspects 10 through 17, wherein the instructions further cause the one or more processors to control the operation of the AV based on the final classification output of the raw image data.

Aspect 19. A non-transitory computer-readable storage medium having stored therein instructions which, when executed by one or more processors, cause the one or more processors to: access raw image data of an image gathered by a sensor associated with an autonomous vehicle (AV) during operation of the AV; apply a first stage of a two-stage classifier to the raw image data to generate a classification output of the first stage of the two-stage classifier, wherein the first stage of the two-stage classifier is trained by first raw AV data captured at varying values of one or more capture parameters associated with operating one or more sensors of the AV in capturing the first raw AV data; and apply a second stage of the two-stage classifier to the raw image data to generate a final classification output of the raw image data, wherein: the second stage of the two-stage classifier is formed by a plurality of image calibration classifiers trained by second raw AV data at varying values of one or more image calibration parameters; and an image calibration classifier of the plurality of image calibration classifiers is selected based on the classification output of the first stage of the two-stage classifier and applied to the raw image data as part of applying the second stage of the two-stage classifier to generate the final classification output of the raw image data.

Aspect 20. The non-transitory computer-readable storage medium of Aspect 19, wherein the plurality of image calibration classifiers correlate to different classification outputs of the first stage of the two-stage classifier and the image calibration classifier is selected from the plurality of image calibration classifiers based on a correlation between the classification output of the first stage and the image calibration classifier.

Aspect 21. A system comprising means for performing a method according to any of Aspects 1 through 9.

What is claimed is:
1. A computer-implemented method comprising:
  accessing raw image data of an image gathered by a sensor associated with an autonomous vehicle (AV) during operation of the AV;
  applying a first stage of a two-stage classifier to the raw image data to generate a classification output of the first stage of the two-stage classifier, wherein the first stage of the two-stage classifier is trained by first raw AV data captured at varying values of one or more capture parameters associated with operating one or more sensors of the AV in capturing the first raw AV data; and
  applying a second stage of the two-stage classifier to the raw image data to generate a final classification output of the raw image data, wherein:
    the second stage of the two-stage classifier is formed by a plurality of image calibration classifiers trained by second raw AV data at varying values of one or more image calibration parameters; and
    an image calibration classifier of the plurality of image calibration classifiers is selected based on the classification output of the first stage of the two-stage classifier and applied to the raw image data as part of applying the second stage of the two-stage classifier to generate the final classification output of the raw image data.
2. The computer-implemented method of claim 1, wherein the raw image data is captured while varying values of the one or more capture parameters of the sensor associated with the AV.

3. The computer-implemented method of claim 1, wherein the plurality of image calibration classifiers correlate to different classification outputs of the first stage of the two-stage classifier and the image calibration classifier is selected from the plurality of image calibration classifiers based on a correlation between the classification output of the first stage and the image calibration classifier.

4. The computer-implemented method of claim 3, wherein the plurality of image calibration classifiers are correlated to the different classification outputs of the first stage based on corresponding values of the one or more capture parameters associated with the different classification outputs of the first stage in relation to corresponding values of the one or more image calibration parameters associated with training the plurality of image calibration classifiers.

5. The computer-implemented method of claim 3, wherein the plurality of image calibration classifiers are correlated to the different classification outputs of the first stage based on corresponding objects detected as part of the different classification outputs of the first stage.

6. The computer-implemented method of claim 1, wherein the one or more capture parameters that are varied in training the first stage of the two-stage classifier include an aperture parameter, an exposure parameter, a frame rate parameter, a gain parameter, or a combination thereof.

7. The computer-implemented method of claim 6, wherein the exposure parameter is varied during a time frame and the raw image data captured by the sensor associated with the AV and captured during the time frame includes images captured at different exposure times.

8. The computer-implemented method of claim 1, wherein the one or more image calibration parameters that are varied in training the plurality of image calibration classifiers include a contrast parameter, a tone mapping parameter, a color rendering parameter, a histogram stretching parameter, or a combination thereof.

9. The computer-implemented method of claim 1, further comprising controlling the operation of the AV based on the final classification output of the raw image data.

10. A system comprising:
one or more processors; and
at least one computer-readable storage medium having stored therein instructions which, when executed by the one or more processors, cause the one or more processors to:
access raw image data of an image gathered by a sensor associated with an autonomous vehicle (AV) during operation of the AV;
apply a first stage of a two-stage classifier to the raw image data to generate a classification output of the first stage of the two-stage classifier, wherein the first stage of the two-stage classifier is trained by first raw AV data captured at varying values of one or more capture parameters associated with operating one or more sensors of the AV in capturing the first raw AV data; and
apply a second stage of the two-stage classifier to the raw image data to generate a final classification output of the raw image data, wherein:
the second stage of the two-stage classifier is formed by a plurality of image calibration classifiers trained by second raw AV data at varying values of one or more image calibration parameters; and
an image calibration classifier of the plurality of image calibration classifiers is selected based on the classification output of the first stage of the two-stage classifier and applied to the raw image data as part of applying the second stage of the two-stage classifier to generate the final classification output of the raw image data.

11. The system of claim 10, wherein the raw image data is captured while varying values of the one or more capture parameters of the sensor associated with the AV.

12. The system of claim 10, wherein the plurality of image calibration classifiers correlate to different classification outputs of the first stage of the two-stage classifier and the image calibration classifier is selected from the plurality of image calibration classifiers based on a correlation between the classification output of the first stage and the image calibration classifier.

13. The system of claim 12, wherein the plurality of image calibration classifiers are correlated to the different classification outputs of the first stage based on corresponding values of the one or more capture parameters associated with the different classification outputs of the first stage in relation to corresponding values of the one or more image calibration parameters associated with training the plurality of image calibration classifiers.

14. The system of claim 12, wherein the plurality of image calibration classifiers are correlated to the different classification outputs of the first stage based on corresponding objects detected as part of the different classification outputs of the first stage.

15. The system of claim 10, wherein the one or more capture parameters that are varied in training the first stage of the two-stage classifier include an aperture parameter, an exposure parameter, a frame rate parameter, a gain parameter, or a combination thereof.

16. The system of claim 15, wherein the exposure parameter is varied during a time frame and the raw image data captured by the sensor associated with the AV and captured during the time frame includes images captured at different exposure times.

17. The system of claim 10, wherein the one or more image calibration parameters that are varied in training the plurality of image calibration classifiers include a contrast parameter, a tone mapping parameter, a color rendering parameter, a histogram stretching parameter, or a combination thereof.

18. The system of claim 10, wherein the instructions further cause the one or more processors to control the operation of the AV based on the final classification output of the raw image data.

19. A non-transitory computer-readable storage medium having stored therein instructions which, when executed by one or more processors, cause the one or more processors to:
access raw image data of an image gathered by a sensor associated with an autonomous vehicle (AV) during operation of the AV;
apply a first stage of a two-stage classifier to the raw image data to generate a classification output of the first stage of the two-stage classifier, wherein the first stage of the two-stage classifier is trained by first raw AV data captured at varying values of one or more capture parameters associated with operating one or more sensors of the AV in capturing the first raw AV data; and
apply a second stage of the two-stage classifier to the raw image data to generate a final classification output of the raw image data, wherein:
the second stage of the two-stage classifier is formed by a plurality of image calibration classifiers trained by second raw AV data at varying values of one or more image calibration parameters; and an image calibration classifier of the plurality of image calibration classifiers is selected based on the classification output of the first stage of the two-stage classifier and applied to the raw image data as part of applying the second stage of the two-stage classifier to generate the final classification output of the raw image data.

20. The non-transitory computer-readable storage medium of claim 19, wherein the plurality of image calibration classifiers correlate to different classification outputs of the first stage of the two-stage classifier and the image calibration classifier is selected from the plurality of image calibration classifiers based on a correlation between the classification output of the first stage and the image calibration classifier.

* * * * *